us009971614B2

United States Patent
Asami (10) Patent No.: US 9,971,614 B2
(45) Date of Patent: May 15, 2018

(54) INFORMATION PROCESSING APPARATUS AND METHOD OF CONTROLLING THE SAME

(71) Applicant: CANON KABUSHIKI KAISHA, Tokyo (JP)

(72) Inventor: Takenori Asami, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/238,272

(22) Filed: Aug. 16, 2016

(65) Prior Publication Data
US 2017/0060554 A1 Mar. 2, 2017

(30) Foreign Application Priority Data

Aug. 24, 2015 (JP) ................... 2015-165150

(51) Int. Cl.
*G06F 9/45* (2006.01)
*G06F 9/455* (2018.01)
(52) U.S. Cl.
CPC .................. *G06F 9/4552* (2013.01)
(58) Field of Classification Search
CPC .................................................. G06F 9/4552
USPC .................................................. 717/140–151
See application file for complete search history.

(56) References Cited

U.S. PATENT DOCUMENTS

| 6,546,550 | B1 * | 4/2003 | Ogata | G06F 9/45504 712/233 |
| 6,718,539 | B1 * | 4/2004 | Cohen | G06F 9/30174 712/E9.037 |
| 6,973,646 | B1 * | 12/2005 | Bordawekar | G06F 9/45516 713/168 |
| 7,013,456 | B1 * | 3/2006 | Van Dyke | G06F 9/45533 712/208 |
| 7,089,539 | B2 * | 8/2006 | Dornan | G06F 9/45504 703/26 |

(Continued)

FOREIGN PATENT DOCUMENTS

JP 5167589 B2 3/2013

OTHER PUBLICATIONS

Newsome et al, "Proxy Compilation of Dynamically Loaded Java Classes with MoJo", ACM, pp. 204-212, 2002.*

(Continued)

*Primary Examiner* — Anil Khatri
(74) *Attorney, Agent, or Firm* — Carter, DeLuca, Farrell & Schmidt, LLP (57) ABSTRACT

This invention generates, when the application issues a request, the native code of a function required at the timing and registers the native code in a code cache. This makes it possible to perform processing at high speed as long as the function is requested at a timing earlier than the timing of actually executing the function. This apparatus includes an execution unit configured to execute a native code corresponding to a function requested from the application when the native code is stored in a cache memory and to execute the function requested from the application in an interpreter form when the native code is not stored in the cache memory, and a dynamic compilation unit configured to compile, when a compilation request is received from the application, a requested function and record a generated native code in the cache memory.

7 Claims, 8 Drawing Sheets

(56) References Cited

U.S. PATENT DOCUMENTS

| | | | | |
|---|---|---|---|---|
| 7,617,490 B2* | 11/2009 | Nanja | ............ | G06F 8/4434 717/140 |
| 7,784,041 B2* | 8/2010 | Lam | ............ | G06F 9/45516 717/136 |
| 7,788,657 B2* | 8/2010 | Wannamaker | ........ | G06F 8/4434 717/118 |
| 7,853,934 B2* | 12/2010 | Partamian | ............ | G06F 8/67 717/106 |
| 8,082,542 B2* | 12/2011 | Bottomley | ............ | G06F 8/4441 717/148 |
| 8,516,460 B2* | 8/2013 | Bates | ............ | G06F 8/4432 702/130 |
| 8,522,209 B2* | 8/2013 | Wintergerst | ........ | G06F 11/3466 717/124 |
| 8,539,464 B2* | 9/2013 | Partridge | ............ | G06F 9/4552 709/203 |
| 8,769,511 B2* | 7/2014 | Gal | ............ | G06F 8/52 717/148 |
| 8,819,649 B2* | 8/2014 | Lafreniere | ............ | G06F 8/41 717/139 |
| 8,875,114 B2* | 10/2014 | Bohizic | ............ | G06F 12/0875 717/151 |
| 8,938,728 B2* | 1/2015 | Kawachiya | ............ | G06F 8/4441 717/140 |

OTHER PUBLICATIONS

Grimmer et al, "An Efficient Native Function Interface for Java", ACM, pp. 35-44, 2013.*
Ei-Shobaky et al, "Automatic Vectorization Using Dynamic Compilation and Tree Pattern Matching Technique in JikesRVM", ACM, pp. 63-69, 2009.*
Zheng et al, "Accurate Profiling in the Presence of Dynamic Compilation", ACM, pp. 433-450, 2015.*
Stepanian et al, "Inlining Java Native Calls At Runtime", ACM, pp. 121-131, 2005.*
Lee et al, "A Dynamic Tool for Finding Redundant Computations in Native Code ", ACM, pp. 15-21, 2008.*
"Summary of JIT Compilation and Optimization" (http://otndnId.oracle.co.jp/document/products/jrockit/geninfo/diagnos/underst_jit.html) https://docs.oracle.com/cd/E13150_01/jrockit_jvm/jrockit/geninfo/pdf/diagnos.pdf (English equivalent).

* cited by examiner

APPLICATION PRIORITY DEFINITION TABLE

| App ID | App NAME | CACHE PRIORITY LEVEL (1 TO 5) | IMPORTANCE DEGREE (1 TO 10) |
|---|---|---|---|
| 001 | SYSTEM APPLICATION A | 5 | 10 |
| 002 | SYSTEM APPLICATION B | 5 | 9 |
| 003 | USER APPLICATION 1 | 3 | 5 |
| 004 | USER APPLICATION 2 | 3 | 4 |
| ... | ... | ... | ... |

INFORMATION PROCESSING APPARATUS AND METHOD OF CONTROLLING THE SAME

BACKGROUND OF THE INVENTION

Field of the Invention

The present invention relates to dynamic compilation.

Description of the Related Art

Conventionally, in a virtual machine environment as a program execution environment, there is known a means called JIT (Just In Time) compilation, which performs compilation of native codes during execution of an application. JIT compilation preferentially converts functions with large call counts into native codes during execution of a program. Literatures disclosing such a technique include Japanese Patent No. 5167589. In addition, native codes are temporarily saved in a memory area called a code cache. When the code cache becomes full, native codes are sequentially discarded from the code cache in ascending order of execution frequency.

If no native code is generated, an application is executed in an interpreter scheme. The execution speed in the interpreter scheme is lower than when the application is executed by native codes. Note that since native codes are generated during execution of an application, a high-speed operation using native codes cannot be performed in the initial use of the application. As a technique for solving this problem, there is known a conventional technique of loading an application and completing JIT compilation in advance before the user executes the application. See, for example, "Summary of JIT Compilation and Optimization".

However, all the functions called by an application loaded in advance by the conventional technique are not always required in practice. If, for example, the user uses only some functions of an application, some functions are not called. JIT compilation is not required for such functions.

Assume that after the native code of a given function F saved in a code cache is discarded, the function F is called again. In this case, compilation is sometimes performed again. In such a case, the same native code as that generated before is generated again. This can be regarded as a wasteful operation.

SUMMARY OF THE INVENTION

The present invention has been made to solve the above problem. The present invention provides an environment in which some applications can be executed at high speed.

According to an aspect of the invention, there is provided an information processing apparatus functioning as a virtual machine which executes an application, the apparatus comprising: an execution unit configured to execute a native code corresponding to a function requested from the application when the native code is stored in a cache memory and to execute the function requested from the application in an interpreter form when the native code is not stored in the cache memory; and a dynamic compilation unit configured to compile, when a compilation request is received from the application, a requested function and record a generated native code in the cache memory.

The present invention not only provides an execution environment for an application but also generates, in response to a request from the application, a native code for a function required at the timing, and registers it in a cache memory. This makes it possible to perform high-speed processing as long as the function is requested at a timing earlier than the actual execution timing of the function.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings. Note that the constituent elements described in the following embodiments are merely examples. The present invention is not limited to the constituent elements shown in the accompanying drawings.

First Embodiment

Figure 1:
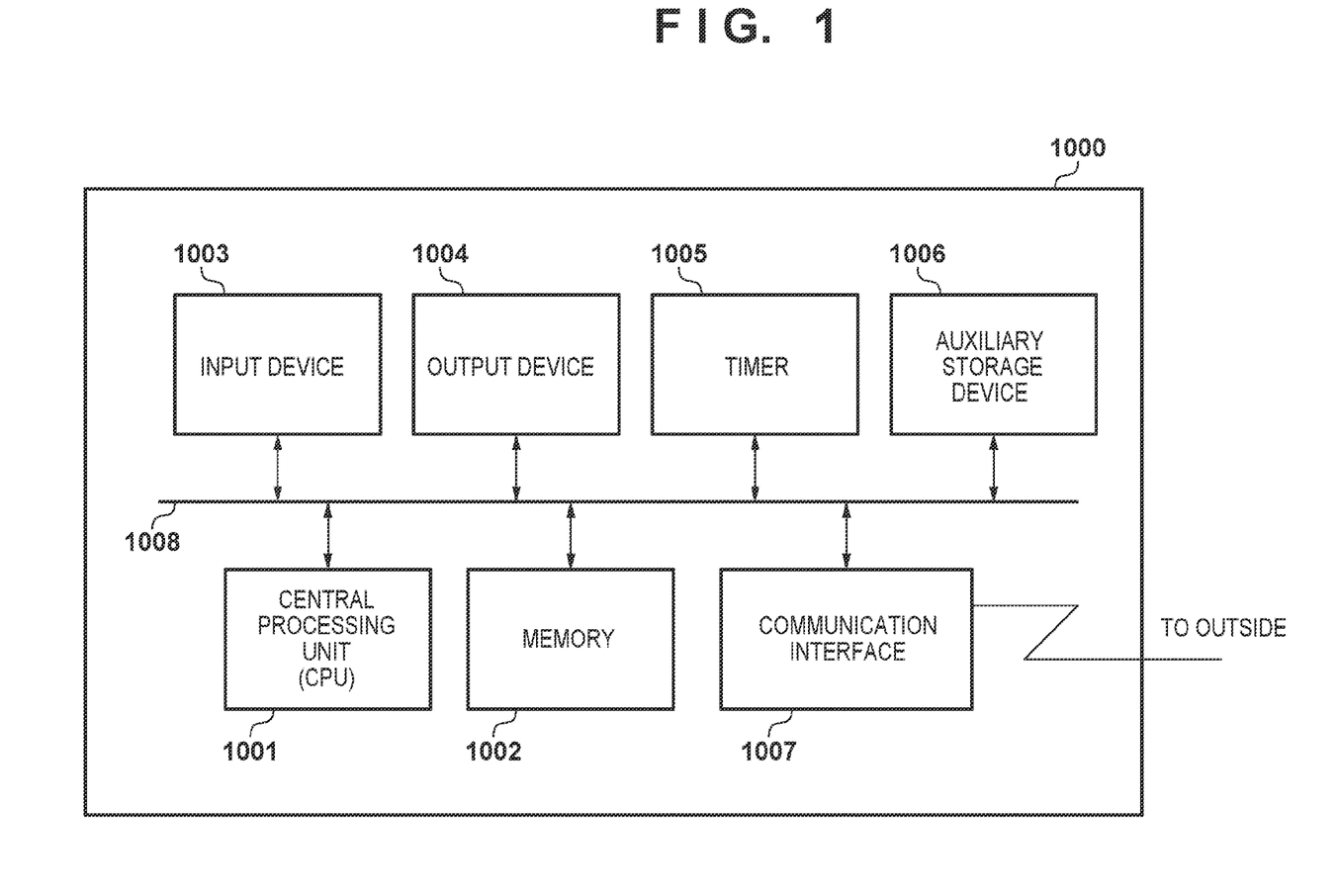
FIG. 1 is a block diagram showing a hardware arrangement.

FIG. 1 is a block diagram showing the hardware arrangement of an information processing apparatus 1000 according to this embodiment. A central processing unit (to be referred to as a CPU) 1001 is an arithmetic processing unit and executes various types of processing for controlling the overall operation of the apparatus. The CPU 1001 also executes native code generation and application execution. A memory 1002 is a semiconductor memory such as a RAM or ROM, and stores various programs executed by the CPU 1001, computation results, native codes, and the like. The CPU 1001 also includes a code cache. An input device 1003 includes a keyboard, mouse, and touch device, and serves as an interface when the user inputs information at the time of use of an application. An output device 1004 is a display device or the like, and serves as an interface when outputting information such as an application processing result to the user. A timer 1005 performs time management for the execution timing of compilation and the like, measurement of a compilation time, and the like. An auxiliary storage device 1006 is a hard disk drive or the like, and is used as a save destination of various types of data. A communication interface 1007 controls data input/output with respect to an external network (including the Internet). A system bus 1008 connects the constituent elements denoted by reference numerals 1001 to 1007 and serves as an information transfer path between the respective constituent elements.

Figure 2:
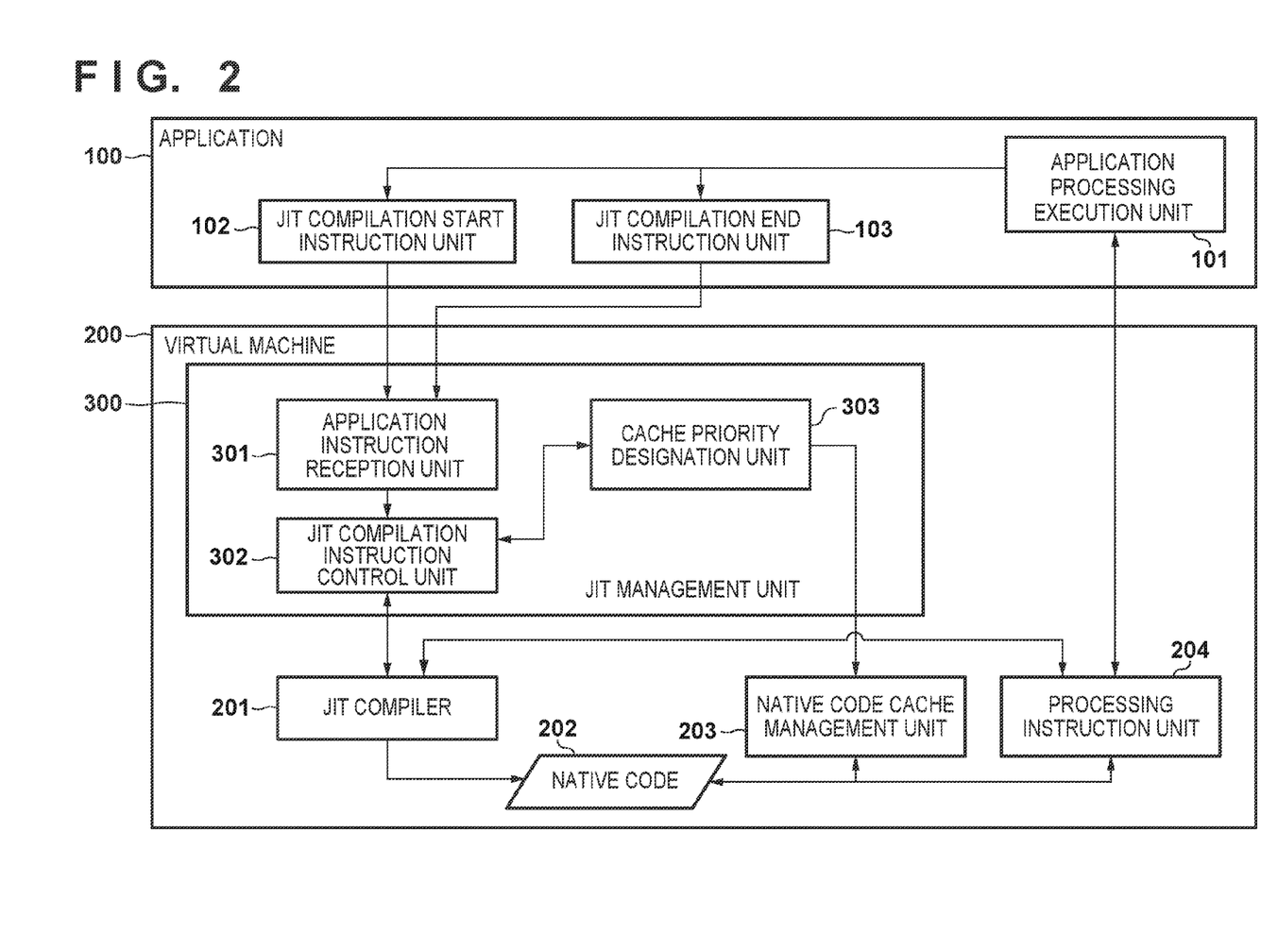
FIG. 2 is a block diagram showing the functional arrangement of an apparatus according to the first embodiment.

FIG. 2 is a block diagram showing the arrangement of a system implemented on the apparatus shown in FIG. 1, which is required for this embodiment. This system is constituted by an application 100 and a virtual machine 200. The virtual machine 200 incorporates a JIT (Just In time) management unit 300. In this embodiment, a Java® VM (Virtual Machine) is assumed as the virtual machine 200. Obviously, the CPU 1001 in the information processing apparatus 1000 implements the application 100 and the virtual machine 200 by executing corresponding software. That is, the application 100 and the virtual machine 200 exist in the same physical apparatus. Note that the following description will exemplify processing mainly executed by the processing unit shown in FIG. 2. In practice, however, the CPU 1001 implements this processing by executing programs functioning as the respective processing units.

The application 100 includes an application processing execution unit 101, a JIT compilation start instruction unit 102, and a JIT compilation end instruction unit 103. The application processing execution unit 101 executes processing for various types of applications used by the user. The application processing execution unit 101 has a function of receiving an input from the user, transferring various types of processing contents to the virtual machine 200, receiving processing results from the virtual machine 200, and presenting (displaying) the results to the user. The JIT compilation start instruction unit 102 has a function of transferring a JIT compilation start instruction and target functions to the JIT management unit 300. The JIT compilation end instruction unit 103 has a function of transferring a JIT compilation end instruction and target functions to the JIT management unit 300.

The virtual machine 200 includes a JIT compiler 201, a native code cache management unit 203, a processing instruction unit 204, and the JIT management unit 300.

The JIT compiler 201 has a function of generating a native code (a code which can be directly interpreted by the CPU 1001) 202 for each function in a program. In addition, the JIT compiler 201 operates upon reception of an instruction from a JIT compilation instruction control unit 302 (to be described later). The JIT compiler 201 also has a function of detecting a function with a large call count during execution, as described in "Description of the Related Art", and generating the native code of the function.

The native code 202 generated by the JIT compiler 201 is saved in the code cache. It is necessary to assign a priority level to each native code in the code cache and manage when to discard each native code from the cache. The native code cache management unit 203 performs this management.

The processing instruction unit 204 executes various types of processing received from an application. The processing instruction unit 204 executes processing in an interpreter scheme. If, however, a native code corresponding to a function to be executed exists (is cached), the processing instruction unit 204 executes processing by using the code. In addition, information such as the call count of each function during execution of processing is transferred to the JIT compiler 201.

The JIT management unit 300 includes an application instruction reception unit 301, the JIT compilation instruction control unit 302, and a cache priority designation unit 303.

The application instruction reception unit 301 receives a start instruction from the application 100 and information about a function subjected to JIT compilation. The JIT compilation instruction control unit 302 has a function of sending an execution start instruction, an execution stop instruction, and the like to the JIT compiler 201. The JIT compilation instruction control unit 302 also has a function of receiving a notification upon completion of JIT compilation and saving the completion time of JIT compilation and a compilation target function in association with each other.

The cache priority designation unit 303 has a function of receiving an instruction from the JIT compilation instruction control unit 302 and issuing an instruction to the native code cache management unit 203 to change the cache priority level of a specific native code in the code cache. In addition, the cache priority designation unit 303 has a function of acquiring information about a JIT compilation completion time from the JIT compilation instruction control unit 302 and issuing an instruction to the native code cache management unit 203 to change the cache priority level in accordance with the elapsed time after the compilation.

Figure 3A:
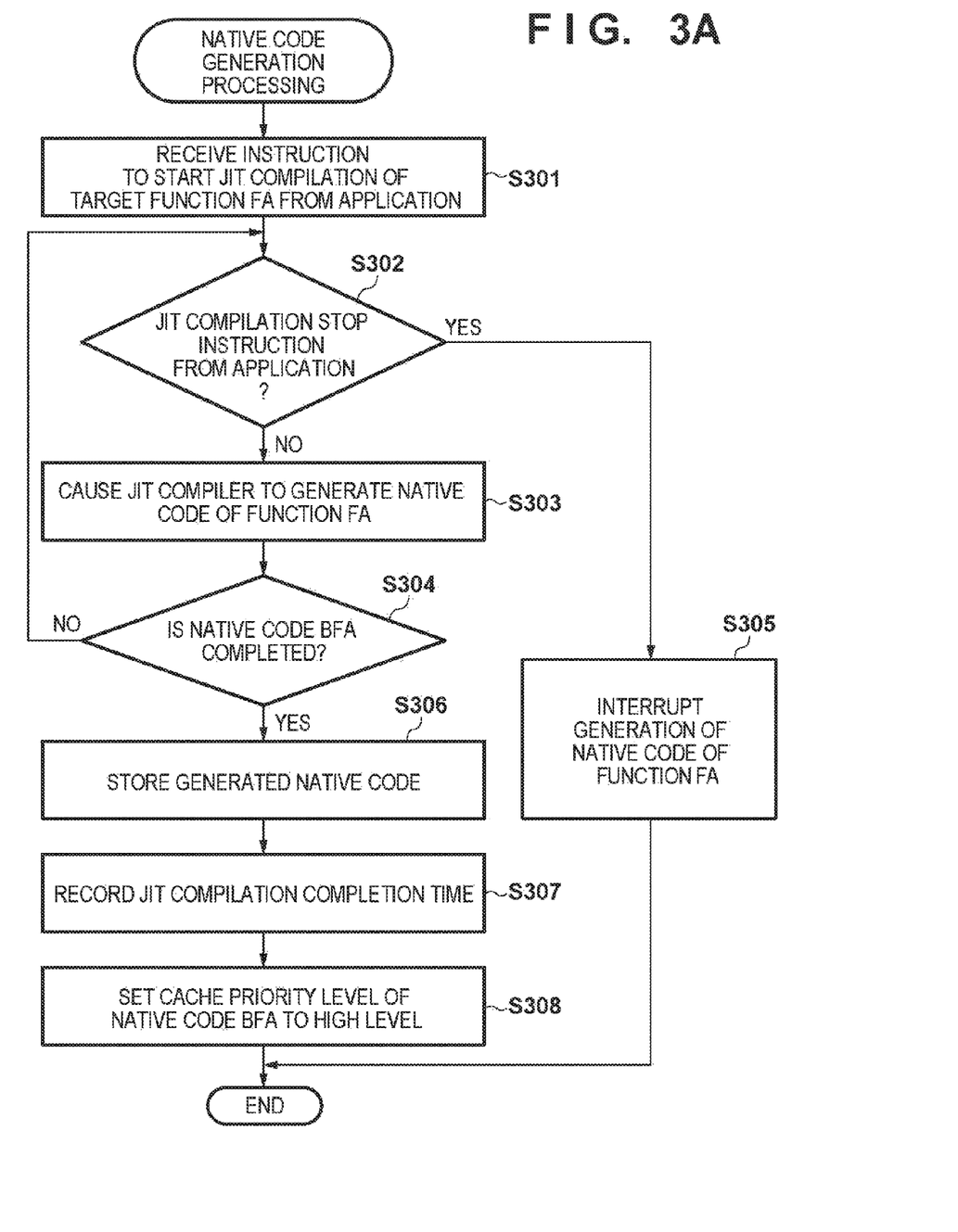
FIGS. 3A and 3B are flowcharts showing JIT compilation processing.
Figure 3B:
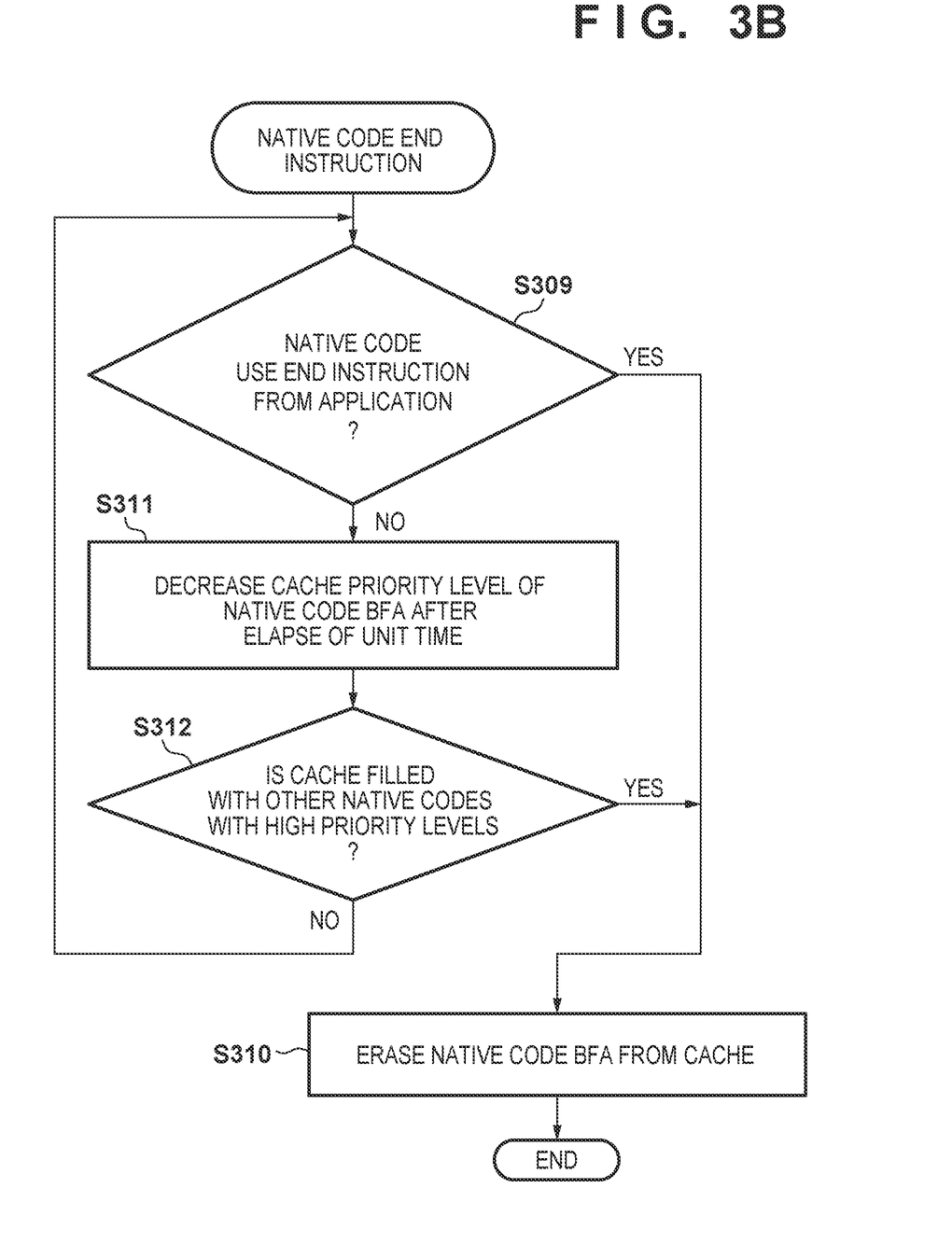

An example of the basic operation of this embodiment will be described next with reference to FIGS. 3A and 3B. Note that FIGS. 3A and 3B show the contents of processing executed by the virtual machine 200, and omits an illustration of the contents of processing performed by the application 100 (regardless of the type of application). As described above, although the CPU 1001 executes processing, the following description will be made with each processing unit in the functional block diagram of FIG. 2 being a subject. FIG. 3A shows processing performed by the virtual machine 200 upon reception of an instruction to perform native code generation processing from the application 100.

First of all, at the timing of requiring JIT compilation, the application 100 controls the JIT compilation start instruction unit 102 to issue a request for JIT compilation (dynamic compilation request) to the application instruction reception unit 301. At this time, the JIT compilation start instruction unit 102 also transfers the name of a function (for example, FA) subjected to JIT compilation to the application instruction reception unit 301. Immediately after the virtual machine 200 receives this request, the JIT compiler 201 starts compiling the function FA (steps S301 and S303). Assume that in this case, the JIT compilation start instruction unit 102 of the application 100 has issued a JIT compilation stop instruction before the completion of the compilation. That is, assume that the application instruction reception unit 301 has received a JIT compilation stop instruction (step S302). In this case, the JIT compilation instruction control unit 302 issues a stop instruction to the JIT compiler 201. The JIT compiler 201 then quickly terminates compilation. The JIT compiler 201 discards various types of files such as an intermediate binary file generated midway in compilation (step S305).

Assume that JIT compilation is complete without reception of any stop instruction from the application 100 (YES in step S304). In this case, the JIT compiler 201 stores the generated native code (for example, BFA) in a code cache (secured in the memory 1002) (not shown) (step S306). In addition, at this time, the JIT compiler 201 notifies the JIT compilation instruction control unit 302 of the completion of the compilation. As a result, the target function FA and the compilation completion time are recorded and managed in association with each other. The JIT compilation instruction control unit 302 performs this operation (step S307).

The cache priority designation unit 303 then performs the processing of setting a high cache priority level for the generated native code BFA. Assume that a previously generated native code BFX is also saved in the code cache. In this case, the conventional technique performs JIT compilation of a function with a large call count during execution of the application 100, as described in "Description of the Related Art". In this embodiment, a higher priority level than that of BFX is set for BFA (step S308). BFA is generated upon intentional issuance of an instruction by the application, and is handled as a native code with higher probability of use than BFX. This makes BFA remain in the cache for a long period of time. This is because when new native codes are generated while the code cache is full, codes are sequentially erased from the code cache in ascending order of priority. Assume that the code cache is filled with BFA and BFX. In this case, when the new native code BFY is generated, BFX with a low priority level is erased. This increases the probability that BFA will remain in the code cache for a long period of time.

In step S303, if the function FA has been compiled and BFA exists in the code cache, there is no need to perform compilation. If the generated native code BFA has been assigned with a low cache priority level, the priority level is reset to a high priority level.

In parallel with the processing in steps S301 to S308, the application executes processing. Issuing a JIT compilation instruction a little before the execution of the function FA by the application will allow the use of the generated native code BFA from the start of the execution of the function FA. This makes it possible to execute the function faster than the conventional method. It is therefore preferable to describe, in the application 100, a compilation start instruction for the function FA a few steps before the description of the function FA to be actually executed.

Processing to be performed by the virtual machine 200 upon reception of a native code end instruction from the application 100 will be described next with reference to FIG. 3B.

The application 100 causes the JIT compilation end instruction unit 103 to issue an end instruction to the application instruction reception unit 301 at the timing at which the use of a given function (for example, FA) is terminated. That is, assume that the virtual machine 200 has received this instruction (including the function name) (step S309). In this case, the JIT compilation instruction control unit 302 controls the cache priority designation unit 303 to cause the native code cache management unit 203 to erase BFA from the code cache (step S310). Alternatively, it is possible to decrease the cache priority level of BFA to the lowest value instead of erasing BFA. In this case, BFA remains in the code cache until the cache becomes full. After the cache becomes full, BFA is immediately replaced by another native code and erased.

Even if no end instruction is issued from the application, the cache priority level of BFA is decreased when a predetermined time elapses since the generation of BFA. In this processing, first of all, the JIT compilation instruction control unit 302 transfers the JIT compilation completion time of the saved function FA to the cache priority designation unit 303. The cache priority designation unit 303 then issues an instruction to the native code cache management unit 203 in accordance with the elapsed time (step S311). When decreasing a priority level, it is possible to gradually decrease the priority level at, for example, predetermined intervals (for example, 30 sec) or decrease the priority level to the lowest value after the elapse of a long period of time of, for example, 5 min. With this operation, the priority level of BFA in the code cache becomes lower than those of other native codes. Consequently, when the code cache becomes full and a new native code enters the cache (step S312), BFA with the low priority level is erased from the code cache (step S310).

With this processing, even if, for example, the application hangs up and is terminated without transmitting an end notification, the generated native code BFA does not continuously remain in the cache.

The above is an example of the basic operation of the virtual machine 200 according to the first embodiment. According to this example, it is possible to prepare the native code of the function FA (register the native code in the cache) at the timing required by the application 100. Therefore, the first execution of the function FA is faster than when the function is executed by an interpreter. In addition, this increases the possibility that the native code BFA will be kept saved in the code cache (cache memory) until the issuance of an application end instruction. That is, BFA is not erased during use from the code cache. This can obviate the necessity to perform wasteful re-compilation of the native code BFA. In addition, when it is obvious that the application 100 will not be used no longer, the corresponding native code can be deleted from the code cache by issuing an instruction to terminate the use of the corresponding function. This can also increase the possibility that the remaining native codes will remain in the cache. In other words, the application 100 can manage the functions remaining in the native code cache to some extent.

Second Embodiment

The second embodiment will exemplify a case in which when performing JIT compilation according to the first embodiment, a native code capable of faster operation is generated by changing the inlining depth.

Figure 4:
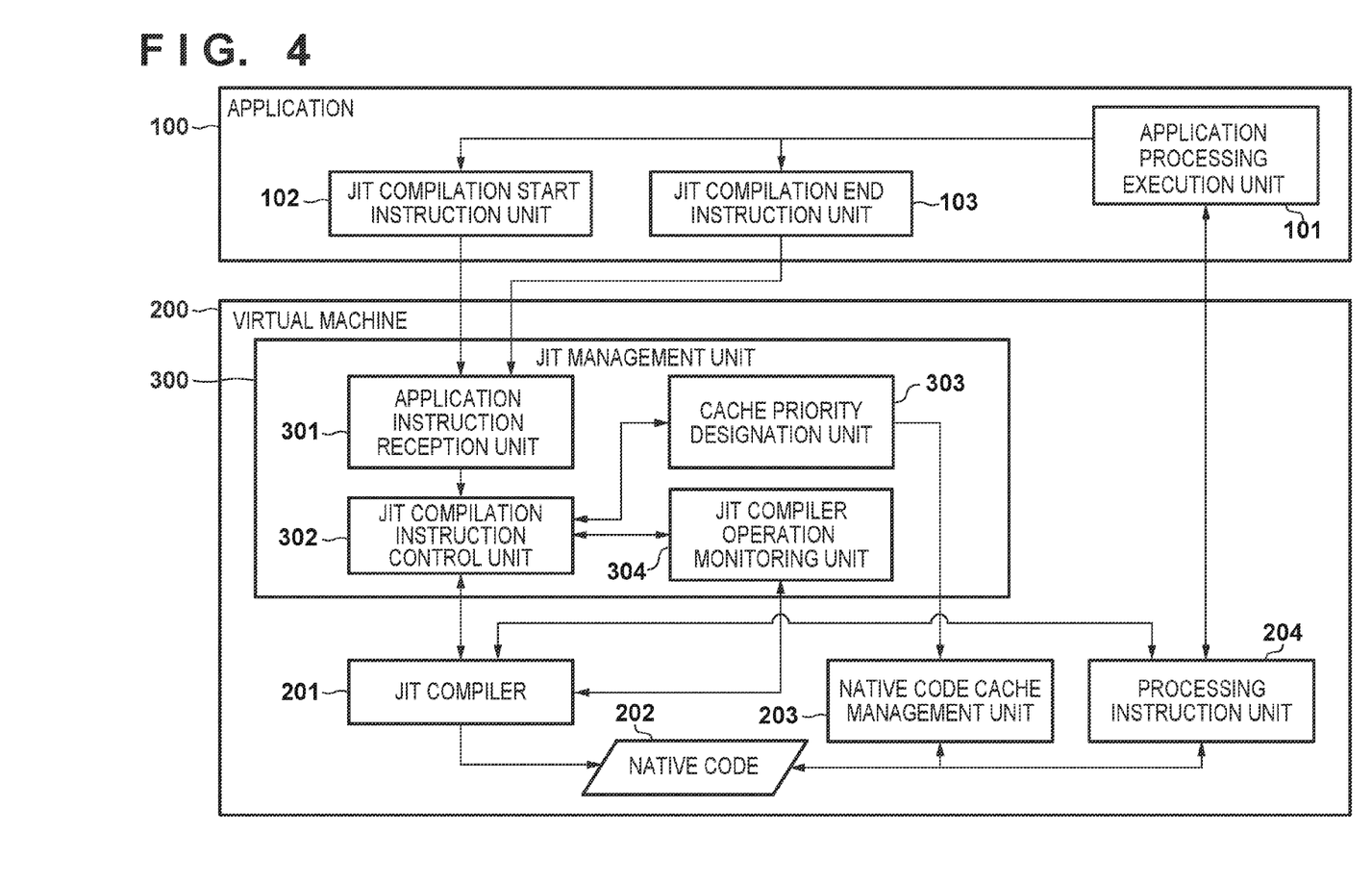
FIG. 4 is a block diagram showing the functional arrangement of an apparatus according to the second embodiment.

FIG. 4 is a block diagram showing the constituent elements of a system required in the second embodiment. The arrangement of the second embodiment differs from the arrangement shown in FIG. 2 in the first embodiment in that a JIT compiler operation monitoring unit 304 is added.

The JIT compiler operation monitoring unit 304 has a function of monitoring whether the JIT compiler is operating. In addition, the JIT compiler operation monitoring unit 304 has a function of recording a target function of the JIT compiler and the processing time taken for the compilation in association with each other. The JIT compiler operation monitoring unit 304 also has a function of recording the code size of a target function and a function name in association with each other.

Figure 5:
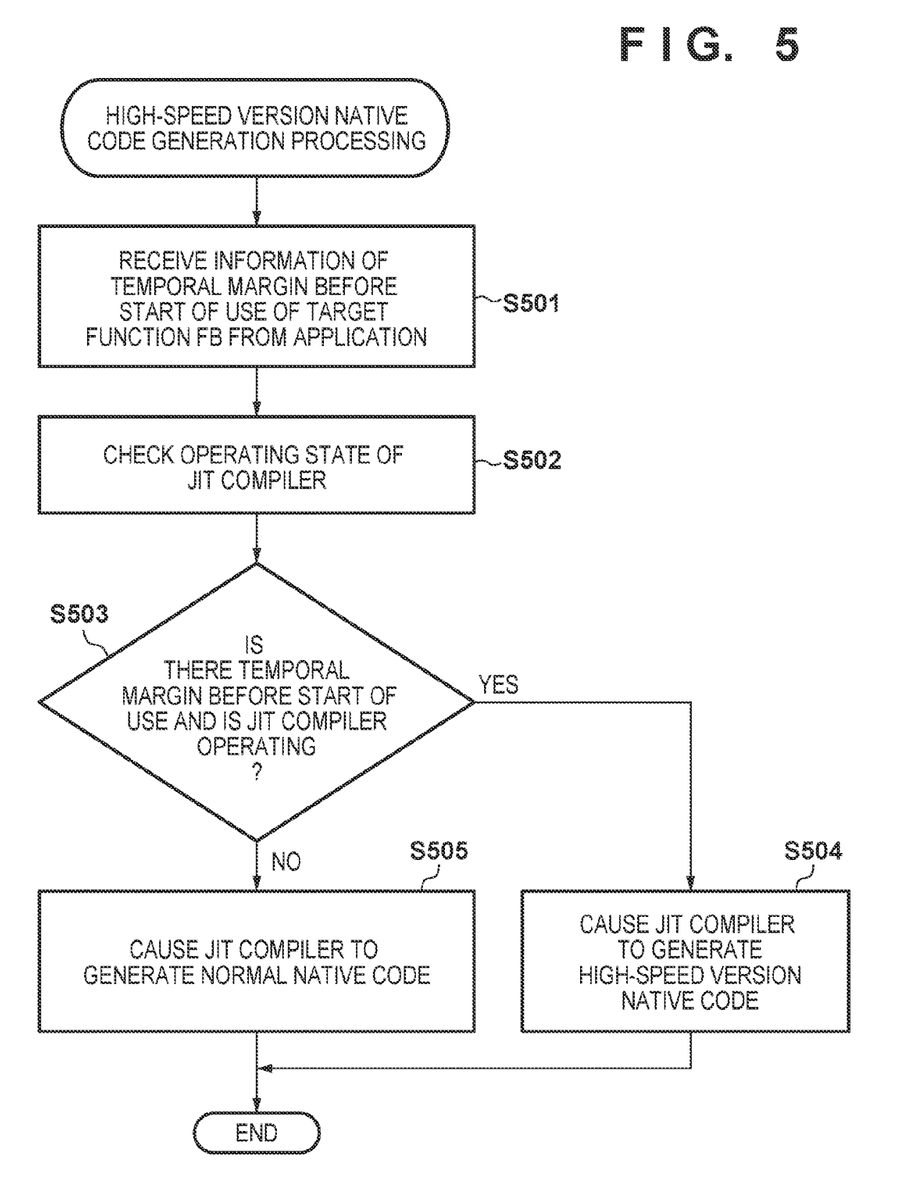
FIG. 5 is a flowchart showing a high-speed version native code generation processing.

An example of the operation of the second embodiment will be described next with reference to FIG. 5. FIG. 5 shows the contents of processing executed by a virtual machine 200. FIG. 5 omits an illustration of the contents of processing performed by an application 100.

First of all, the application 100 sends a target function name FB of the JIT compilation and a JIT compilation instruction to the virtual machine 200. At this time, the application 100 also sends a parameter indicating a temporal margin before the start of use of the function FB by the application. This temporal margin takes one of two-step values "long" and "short". When desiring to use instantly the function FB, the application sends the parameter value "short" as a temporal margin to an application instruction reception unit 301. When desiring to use the function FB until some time later, the application sends the parameter value "long" as a temporal margin to the application instruction reception unit 301. The application instruction reception unit 301 of the virtual machine 200 receives the function FB and the information indicating the temporal margin, as described above (step S501).

If the value of the temporal margin information from the application instruction reception unit 301 is "long", a JIT compilation instruction control unit 302 outputs a preset instruction to the JIT compiler operation monitoring unit 304. Upon receiving this instruction, the JIT compiler operation monitoring unit 304 checks whether a JIT compiler 201 is currently operating (step S502). If the JIT compiler 201 is not operating and the temporal margin is "long", the JIT compiler operation monitoring unit 304 sets the inlining depth to a large value in the JIT compiler 201, and causes the JIT compiler 201 to start JIT compilation for the generation of an execution-speed-priority native code. A value for designating this inlining depth corresponding to a designated value of the option "-XX:MaxInlineSize" in Java®. Increasing this value will generate a native code capable of faster operation (to be referred to as a high-speed version native code hereinafter). However, a longer compilation processing time than usual is required (step S504).

If the temporal margin is "short", the JIT compilation instruction control unit 302 issues an instruction to start normal JIT compilation without changing the value of the inlining depth (step S503).

In steps S504 and S505, if the JIT compiler is compiling another function, the JIT compilation instruction control unit 302 issues an instruction to start compilation after waiting for the termination of the compilation. In this case, since the JIT compilation instruction control unit 302 waits for the termination of the compilation, the JIT compiler is made to perform compilation after the temporal margin is set to "short". Note that the generation condition for a high-speed version native code shown in step S503 may be changed. For example, if the temporal margin is "long", a high-speed version native code may always be generated.

Although the above description has exemplified the method of changing an inlining depth as a method of generating a high-speed version native code, any means can be used as long as it can generate a native code capable of operating faster. For example, it is possible to use Java® C2 compiler designed to optimize codes.

With the above operation, it is possible to make the function FB executed by the application operate faster.

Note that the above has described the embodiment configured to generate a native code. The processing of erasing a native code from the cache and the processing of interrupting the generation of a native code are the same as the processing in steps S305 to S312 in FIGS. 3A and 3B.

Third Embodiment

The third embodiment will exemplify a case in which when it is possible to predict the time when an application will use a function, the start time of a JIT compiler is designated. A use case in which it is possible to predict the time when an application will use a function will be described first.

Consider, for example, an application which starts printing at time T1 designated by the user. In this case, it is possible to predict that a function FC associated with print processing is used at T1. In addition, consider, for example, an application which needs to load a predetermined setting file every time before the execution of print processing. In this case, if it takes a time T2 to load a set file according to a prediction from past performance, it can be predicted that the function FC associated with print processing will be used the time T2 after the user performed an operation for the start of printing. As described above, if it is possible to predict the time when the application will use the function FC, the third embodiment can be applied.

Figure 6:
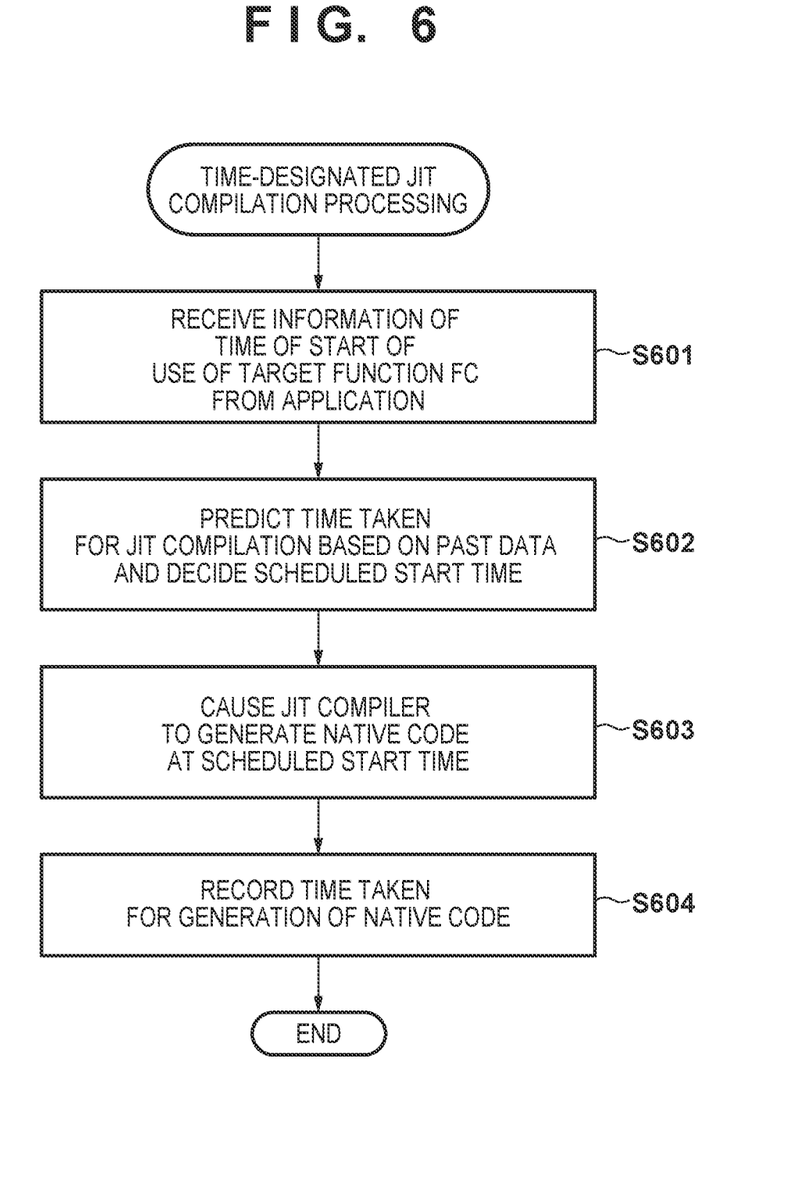
FIG. 6 is a flowchart showing time-designated JIT compilation processing.

The functional arrangement of the third embodiment is the same as that shown in FIG. 4. The contents of processing performed by this arrangement will be described with reference to FIG. 6. Note that FIG. 6 shows the contents of processing executed by a virtual machine 200, and omits an illustration of the contents of processing performed by an application 100.

The application 100 sends a target function name "FC" of the JIT compiler and time T3 of the use of a function FC to an application instruction reception unit 301. That is, the application instruction reception unit 301 of the virtual machine 200 receives the target function name "FC" of the JIT compiler and time T3 of the use of the function FC from the application 100 (step S601). A JIT compilation instruction control unit 302 decides time (to be referred to as compilation start time) T3' when a start instruction is sent to a JIT compiler 201 based on the information received from the application instruction reception unit 301 (step S602).

Time T3' is decided according to T3'=T3−Tc where Tc is a JIT compilation time predicted from past data. Tc is predicted by using the data of a compilation processing time in the past which is recorded in a JIT compiler operation monitoring unit 304. First of all, a search is made for a function having the same size as the target function FC, and the compilation processing time taken for the function in the past is set as Tc.

When time T3' decided in the above manner comes, the JIT compilation instruction control unit 302 sends a start instruction to the JIT compiler 201, and the JIT compiler 201 starts to generate a native code (step S603). Upon completing the generation of a native code, the JIT compiler 201 sends a completion notification to the JIT compilation instruction control unit 302. Upon receiving the notification, the JIT compilation instruction control unit 302 issues an instruction to the JIT compiler operation monitoring unit 304. The JIT compiler operation monitoring unit 304 then saves data concerning the time taken for the generation of the native code and the code size of the function FC (step S604). This data is used for the prediction of a next or later compilation start time.

With the above processing, even if an application calls a function after a long time, it is possible to prepare a native code immediately before the function is called. As a result, since the corresponding function is actually executed while the native code is cached, it is possible to perform the processing at high speed. Note that the third embodiment may be executed in combination with high-speed version binary generation described in the second embodiment. That is, when a compilation start time comes long time later, a high-speed version binary may be generated.

Fourth Embodiment

The fourth embodiment will exemplify a case in which the priority level of a generated native code is changed in accordance with the type of application 100.

Figure 7:
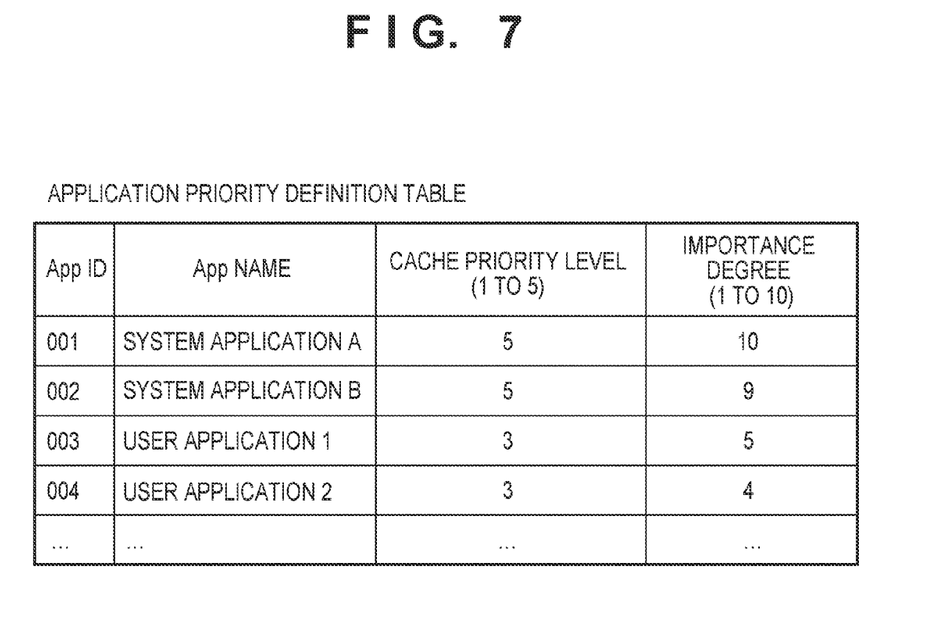
FIG. 7 is a view showing an application priority definition table.

First of all, an application ID (to be referred to as an App ID hereinafter) is set in advance by using some programs of a virtual machine 200 (or programs independent of the virtual machine). FIG. 7 shows a table indicating the correspondence relationship between application IDs generated by this setting processing and priority levels. This table is stored/held in an auxiliary storage device 1006, and the information of the table is maintained unless there is the issuance of, for example, instructions to change, modify, and delete. Assume that system applications A and B are not selected by the user but are set as defaults.

When receiving an instruction from the application 100 in step S301 in FIG. 3A, the virtual machine 200 also receives App ID. When setting a cache priority level in step S308, the virtual machine 200 uses a priority level decided for each application according to, for example, the table shown in FIG. 7. Referring to FIG. 7, an importance degree and a cache priority level are defined in advance for each application. In addition, according to FIG. 7, the system applications (App IDs=001 and 002) are assigned with cache priority levels higher than those of the user applications (App IDs=003 and 004). That is, when both the native code of a function called by a system application and the native code of a function called by a user application exist in the code cache, the former remains for a long period in the cache. This setting is effective when a system application is more important than a user application and desired to always operate at high speed.

With this operation, the native code of a function called by an important application is stored at an upper position in the code cache, and hence it is possible to perform control to decrease the probability of erasure.

Fifth Embodiment

The fifth embodiment will describe the adjustment of a compilation order when an application instruction reception unit 301 receives a large quantity of JIT compilation instructions from a plurality of applications in a short period of time.

When a virtual machine 200 receives a large quantity of instructions in a short period of time, JIT compilation processing is performed first for instructions which have already been received, and the remaining instructions are queued until the end of the processing. The fifth embodiment is configured to change the order of a plurality of instructions in the queued state.

When, for example, App IDs of instruction transmission sources and their importance degrees are decided as shown in FIG. 7, the instructions in the queued state are rearranged in descending order of importance degree. In this case, the position of an instruction received from the important system application indicated by App ID=001 is changed to the uppermost position. With this operation, even if a large quantity of JIT compilation instructions are issued, a native code used by an important application is preferentially generated first.

In addition, alternatively, the order of instructions may be changed based on past history information instead of the importance degrees of applications. If, for example, an end instruction is received from an application in step S309, the App ID of the instruction transmission source is recorded, and the times of reception of end instructions are totaled for each App ID. Usually, as described in the first embodiment, when an application terminates the use of the function FA, the application issues a corresponding end instruction. An application in an abnormal state, for example, in a hang-up state sometimes issues no end instruction. That is, an application with a small number of times of issuance of an end instruction is determined as an application whose probability of being set in an abnormal state is high. For this reason, the rank of an instruction from such an application is decreased. This makes it possible to give higher priority to normal applications which are not set in an abnormal state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-165150, filed Aug. 24, 2015, which is hereby incorporated by reference herein in its entirety.

What is claimed is:

1. An information processing apparatus functioning as a virtual machine which executes an application, the apparatus comprising:
   one or more processors:
   a memory coupled to the one or more processors and having instructions stored thereon
   that, when executed by the one or more processors, cause the information processing apparatus to:
   execute a native code corresponding to a function requested from the application when the native code is stored in a cache memory and execute the function requested from the application in an interpreter form when the native code is not stored in the cache memory; and
   compile, when a compilation request is received from the application, a requested function and record a generated native code in the cache memory, wherein the application issues the compilation request at timing controlled by the application;
   wherein at least one of the instructions, when executed by the one or more processors, further cause the information processing apparatus to erase, upon reception of a function end request from the application, a requested native code from the cache memory or set a priority level of maintenance in the cache memory to a lower priority level.

2. The apparatus according to claim 1, wherein information indicating whether a temporal margin before a timing of use of the function is one of at least two steps is received from the application, and the function is compiled using a parameter for generating native code that prioritizes higher execution-speed the larger the temporal margin is.

3. The apparatus according to claim 1, wherein, when a time of use of the function is set from the application, a compilation start time is decided for completion of generation of the native code at the time, and compilation is performed when the decided compilation start time comes.

4. The apparatus according to claim 1, wherein the instructions that, when executed by the one or more processors, further cause the information procession apparatus to store a table indicating a correspondence relationship between a type of application and a priority level, and
wherein the generated native code is stored at a position in the cache memory which corresponds to a priority level corresponding to the type of application which has requested compilation of a function by referring to the table.

5. The apparatus according to claim 1, wherein the instructions, when executed by the one or more processors, further cause the information processing apparatus to store a table indicating a correspondence relationship between a type of application and a priority level, and
wherein priority is given to a compilation request from an application with a high priority level upon receiving compilation requests from a plurality of applications.

6. A method of controlling an information processing apparatus functioning as a virtual machine which executes an application, the method comprising:
executing a native code corresponding to a function requested from the application when the native code is stored in a cache memory and executing the function requested from the application in an interpreter form when the native code is not stored in the cache memory;
compiling, upon reception of a compilation request from the application, a requested function and recording a generated native code in the cache memory,
wherein the application issues the compilation request at timing controlled by the application; and
erasing, upon reception of a function end request from the application, a requested native code from the cache memory or set a priority level of maintenance in the cache memory to a lower priority level.

7. A non-transitory computer readable storage medium storing a program which is loaded and executed by a computer to cause the computer to function as a virtual machine which executes an application, the program causing a computer to execute:
executing a native code corresponding to a function requested from the application when the native code is stored in a cache memory and executing the function requested from the application in an interpreter form when the native code is not stored in the cache memory;
compiling, upon reception of a compilation request from the application, a requested function and recording a generated native code in the cache memory,
wherein the application issues the compilation request at timing controlled by the application; and
erasing, upon reception of a function end request from the application, a requested native code from the cache memory or set a priority level of maintenance in the cache memory to a lower priority level.

* * * * *